(12) United States Patent
Hibiya et al.

(10) Patent No.: US 9,639,074 B2
(45) Date of Patent: May 2, 2017

(54) POWER SUPPLY SYSTEM

(71) Applicant: Panasonic Corporation, Kadoma-shi, Osaka (JP)

(72) Inventors: Shinpei Hibiya, Osaka (JP); Kiyotaka Takehara, Nara (JP); Akira Baba, Osaka (JP); Kenji Nakakita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 716 days.

(21) Appl. No.: 14/097,353

(22) Filed: Dec. 5, 2013

(65) Prior Publication Data

US 2014/0094985 A1 Apr. 3, 2014

Related U.S. Application Data

(63) Continuation of application No. PCT/JP2012/065260, filed on Jun. 14, 2012.

(30) Foreign Application Priority Data

Jun. 17, 2011 (JP) .................................. 2011-135635

(51) Int. Cl.
*G05B 15/02* (2006.01)
*H01M 10/44* (2006.01)
(Continued)

(52) U.S. Cl.
CPC ............ *G05B 15/02* (2013.01); *H01M 10/44* (2013.01); *H01M 10/48* (2013.01); *H02J 3/32* (2013.01);
(Continued)

(58) Field of Classification Search
CPC ... G05B 15/02; H02J 3/382; H02J 7/35; H02J 9/04; H02J 3/383; H02J 3/32; H02J 3/386;
(Continued)

(56) References Cited

U.S. PATENT DOCUMENTS 8,423,199 B2 * 4/2013 Kalen ..................... F03D 9/007
307/66
2003/0047209 A1 * 3/2003 Yanai ........................ H02J 3/32
136/244
(Continued)

FOREIGN PATENT DOCUMENTS

JP H09-163626 A 6/1997
JP 2005-522164 A 7/2005
(Continued)

OTHER PUBLICATIONS

The Extended European Search Report issued on Jul. 7, 2015 in the counterpart European patent application.
(Continued)

*Primary Examiner* — Ramesh Patel
(74) *Attorney, Agent, or Firm* — Mots Law, PLLC

(57) ABSTRACT

A demand measurement unit measures load demand power and a power generation measurement unit measures solar cell output power. A threshold storage unit stores a discharge control threshold for determining whether to discharge remaining storage cell power. When demand power exceeds generated power, a command unit controls storage cell discharge by comparing remaining storage cell power with the discharge control threshold and transmits a control command to a power conditioner. If the remaining storage cell power exceeds the discharge control threshold, then the command unit commands storage cell discharge. A threshold
(Continued)

setting unit sets the discharge control threshold, and updates the discharge control threshold when that value changes.

19 Claims, 7 Drawing Sheets

(51) Int. Cl.

| | | |
|---|---|---|
| H01M 10/48 | (2006.01) | |
| H02J 3/32 | (2006.01) | |
| H02J 3/38 | (2006.01) | |
| H02J 7/35 | (2006.01) | |
| H02J 9/04 | (2006.01) | |
| H01M 10/42 | (2006.01) | |

(52) U.S. Cl.
CPC ............. *H02J 3/382* (2013.01); *H02J 3/383* (2013.01); *H02J 7/35* (2013.01); *H02J 9/04* (2013.01); *H01M 2010/4271* (2013.01); *H02J 3/386* (2013.01); *H02J 3/387* (2013.01); *Y02B 10/72* (2013.01); *Y02B 90/14* (2013.01); *Y02E 10/563* (2013.01); *Y02E 10/566* (2013.01); *Y02E 10/763* (2013.01); *Y02E 70/30* (2013.01)

(58) Field of Classification Search
CPC ........ H02J 3/387; H01M 10/48; H01M 10/44; H01M 2010/4271; Y02E 10/763; Y02E 10/566; Y02E 10/563; Y02E 70/30; Y02B 10/72; Y02B 90/14
See application file for complete search history.

(56) References Cited

U.S. PATENT DOCUMENTS

| | | | | |
|---|---|---|---|---|
| 2007/0132433 | A1* | 6/2007 | Hehmann | ............... G09F 13/00 323/214 |
| 2007/0191076 | A1* | 8/2007 | Hageman | .......... H04W 52/0261 455/574 |
| 2011/0040418 | A1* | 2/2011 | Kalen | ..................... F03D 9/007 700/291 |
| 2012/0235625 | A1* | 9/2012 | Takehara | .............. H01M 10/44 320/101 |

FOREIGN PATENT DOCUMENTS

| | | |
|---|---|---|
| JP | 2007-295680 A | 11/2007 |
| JP | 2008-42999 A | 2/2008 |
| JP | 2008-148442 A | 6/2008 |
| JP | 2009-284586 A | 12/2009 |
| JP | 2010-130762 A | 6/2010 |
| JP | 2010-273407 A | 12/2010 |
| JP | 2011-83082 A | 4/2011 |
| JP | 2011-103740 A | 5/2011 |
| WO | 2003/084022 A1 | 10/2003 |
| WO | 2011/065495 A1 | 6/2011 |

OTHER PUBLICATIONS

Japanese Office Action dated Dec. 9, 2014 issued for the corresponding Japanese patent application No. 2011-135635.
International Search Report for PCT/JP2012/065260 issued on Jul. 10, 2012.

* cited by examiner

POWER SUPPLY SYSTEM

CROSS REFERENCE TO RELATED APPLICATIONS

This application is a continuation application of International Application No. PCT/JP2012/065260, filed on Jun. 14, 2012, entitled "POWER SUPPLY SYSTEM", which claims priority based on Article 8 of Patent Cooperation Treaty from prior Japanese Patent Application No. 2011-135635, filed on Jun. 17, 2011, the entire contents of which are incorporated herein by reference.

FIELD OF THE INVENTION

The invention relates to a power supply system that includes a power generator and a storage cell and supplies power to a load from at least one of a commercial power source, the power generator and the storage cell.

BACKGROUND

Power supply systems are known that include a storage cell (battery) in addition to a power generator. These can store a difference between power generated by the power generator (generated power) and power consumed by a load (consumed power) as excess power in the storage cell. See, for example, Japanese Patent Application Publication No. 2011-103740 the entire contents of which, and particularly disclosure in and related to Paragraph [0047] are incorporated specifically by reference.

Such systems concern power shortage differences between power that needs to be supplied to the load (demand power) and power generated by the power generator such as a solar cell (generated power). The system covers the power shortage by discharging the storage cell (battery). In short, the storage cell in this patent literature charges excess power expressed by "generated power−consumed power" and discharges to cover the power shortage expressed by "demand power−generated power."

SUMMARY OF THE INVENTION

Embodiments can alleviate certain problems. For example, the configuration to simply discharge the storage cell when the demand power exceeds the generated power (that is, in the case of "demand power−generated power">0) as described in the cited patent application can make power supply to the load rather unstable.

Specifically, when purchased commercial power supplied to a consumer exceeds a contracted amount a breaker may trip to block the power supply to the load. In an example, no power is left in the storage cell since the demand power continuously exceeds the generated power. In this state, a power shortage (demand power−the generated power) that exceeds the contract capacity cannot be covered by the discharge power of the storage cell. Thus, the power supply to the load can no longer be maintained.

The invention was made to address these circumstances. An objective of embodiments is to provide a more stabile power supply system.

Embodiments alleviate the stability problem, as described next. A power supply system may include a generator configured to generate power and a storage cell configured to store power, and supplies power to a load from at least one of a commercial power source, the power generator and the storage cell. The power supply system includes: a demand measurement unit configured to measure demand power of the load, a power generation measurement unit configured to measure power generated by the power generator; a threshold storage unit configured to store a discharge control threshold to determine whether to discharge the storage cell; a command unit configured to give a control command to control discharge of the storage cell based on the result of comparison between the remaining amount of the storage cell and the discharge control threshold, when the demand power is larger than the generated power; a control unit configured to control the discharge of the storage cell according to the control command from the command unit; and a threshold setting unit configured to variably set the discharge control threshold, and write the set discharge control threshold into the threshold storage unit.

In an embodiment of the power supply system, the command unit may give the control command to discharge the storage cell when the remaining amount of the storage cell is larger than the discharge control threshold.

In a further embodiment of the power supply system, the command unit may give the control command to suspend the discharge of the storage cell when the remaining amount of the storage cell is not larger than the discharge control threshold and a difference between the demand power and the generated power is not larger than a predetermined power purchase limit threshold.

In a further embodiment of the power supply system, the command unit may give the control command to discharge the storage cell when the remaining amount of the storage cell is not larger than the discharge control threshold and a difference between the demand power and the generated power is larger than a predetermined power purchase limit threshold.

In a further embodiment of the power supply system, when the remaining amount of the storage cell is not larger than the discharge control threshold and a difference between the demand power and the generated power is larger than the predetermined power purchase limit threshold, the command unit may limit discharged power by the control command so as to discharge only the power corresponding to an excess by which the difference exceeds the power purchase limit threshold.

In a further embodiment of the power supply system, the power supply system may further include a history storage unit configured to store the demand power and the generated power obtained within a past measurement period, as history information. The threshold setting unit may calculate the discharge control threshold by using the history information, and writes the discharge control threshold into the threshold storage unit.

In a further embodiment of the power supply system, the power supply system may further include a weather information acquisition unit configured to acquire future weather forecast information, wherein the power generator generates power by using natural energy, and the generated power varies depending on the weather, the history storage unit stores the history information for each weather type, the threshold setting unit calculates the discharge control threshold for each weather type by using the history information, and writes the discharge control threshold for each weather type into the threshold storage unit, and the command unit selects the discharge control threshold corresponding to the weather forecast information from among the discharge control thresholds stored in the threshold storage unit, and uses the selected discharge control threshold.

A discharge management device is used in an embodiment of a power supply system. The power supply system embodiment includes a power generator, a storage cell and a controller. The power generator generates power. The storage cell stores the power. The controller controls discharge of the storage cell according to a control command. The discharge management device includes a demand measurement unit, a power generation measurement unit, a threshold storage unit, a command unit and a threshold setting unit. The demand measurement unit measures demand power of the load. The power generation measurement unit measures power generated by the power generator. The threshold storage unit stores a discharge control threshold to determine whether to discharge the storage cell. The command unit gives a control command to control the discharge of the storage cell based on the result comparing the remaining amount of the storage cell with the discharge control threshold, when the demand power is larger than the generated power. The controller controls the discharge of the storage cell in response to the control command from the command unit. The threshold setting unit variably sets the discharge control threshold, and writes the set discharge control threshold into the threshold storage unit.

A power supply system includes a discharge management device.

Embodiments provide advantageous effects. An embodiment provides stable power to a load because, when demand power is larger than generated power, storage cell discharge is controlled from the comparison between the remaining storage cell power and the variably set discharge control threshold.

DETAILED DESCRIPTION

Embodiments may be implemented a variety of ways.

Figure 1:
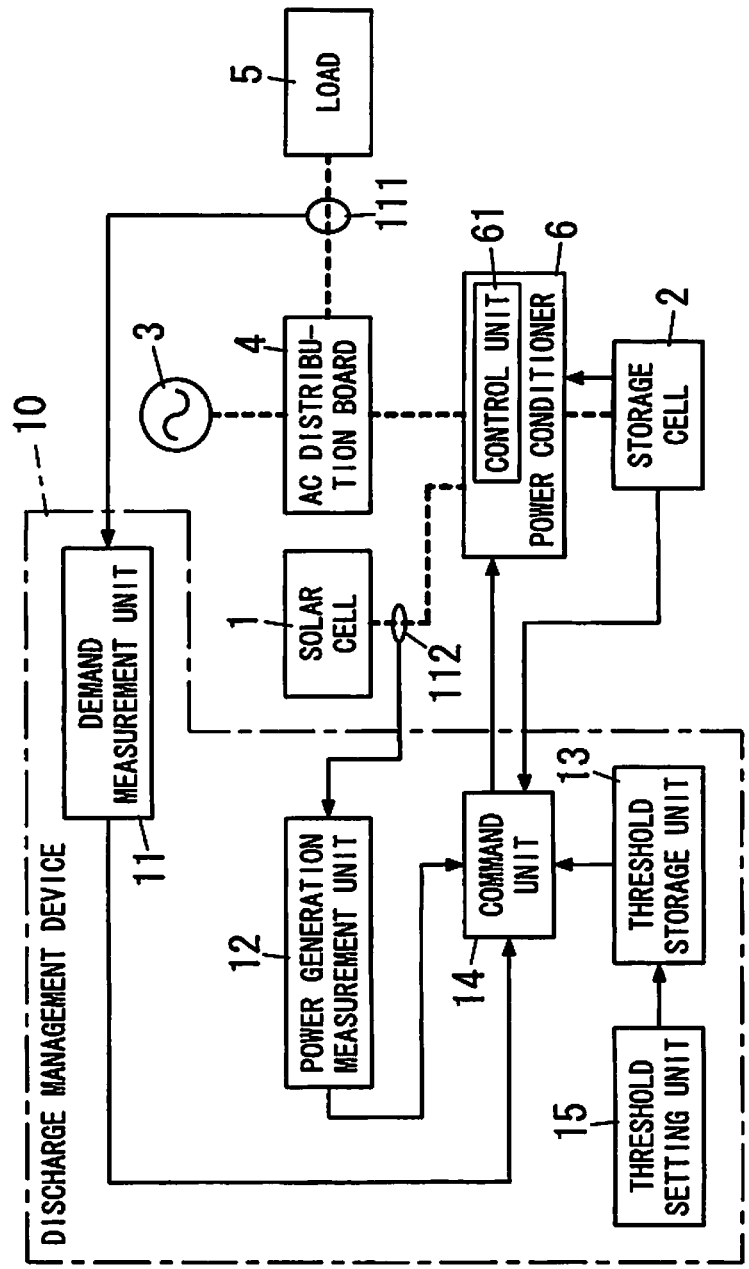
FIG. 1 is a block diagram illustrating a schematic configuration of a power supply system according to Embodiment 1.

In Embodiment 1, a power supply system includes solar cell 1 and storage cell 2 as illustrated in FIG. 1. This supplies power to load 5 connected to AC (alternating-current) distribution board 4 from at least one of commercial power source (alternating-current source) 3, solar cell 1 and storage cell 2. The power supply system further includes power conditioner 6 connected between AC distribution board 4, solar cell 1 and storage cell 2, and discharge management device 10, to be described later.

In an exemplary embodiment, the power supply system is used in general single-family houses. However, without being limited thereto, the power supply system may be used in individual houses in collective housing, in other facilities, in factories, and the like. Note that, in FIG. 1, broken lines indicate strong-electricity connecting wires through which power is exchanged, while solid lines indicate weak-electricity connecting wires through which information (as signals) is exchanged.

Load 5 includes electrical devices such as a TV set, a music player and a personal computer, wiring devices such as outlets and wall switches, equipment such as air conditioners) and light fixtures, and the like, which are installed in various locations in the house. Here, load 5 is an AC (alternating-current)-driven load that receives AC power. However, the power supply system may include a DC (direct-current)-driven load that receives DC power, as a target to which power is supplied.

AC distribution board 4 connects to commercial power source 3. Commercial power source 3 is a 3-wire single phase system and enters the house by lead-in wires (not illustrated) including three wires of a neutral electrode and a pair of voltage electrodes. AC distribution board 4 is installed in the house and houses a main breaker (not illustrated), branch breakers (not illustrated), and the like.

Solar cell 1 forms a power generator configured to generate DC power from natural energy (solar light). Solar cell 1 basically generates power during the day and stops power generation at night due to fluctuations in solar radiation. On the other hand, storage cell 2 can store the power generated by solar cell 1. Therefore, storage cell 2 stores the power from solar cell 1 during the day and discharges at night, for example. This enables smoothing of generated power that fluctuates according to solar radiation.

Power conditioner 6 includes an inverter circuit (not illustrated) configured to convert the DC power from solar cell 1 or storage cell 2 into AC power synchronized in phase with commercial power source 3. An output of power conditioner 6 connects to AC distribution board 4, and power from solar cell 1 or storage cell 2 supplies load 5 via power conditioner 6 and AC distribution board 4. AC distribution board 4 also connects to commercial power source 3. Thus, when total demand power of load 5 cannot be covered only by outputs from solar cell 1 and storage cell 2, power is supplied to load 5 from commercial power source 3.

Power conditioner 6 further includes a protection device (not illustrated) configured to stop the operation of the inverter circuit when a power cut of commercial power source 3 is detected. This is parallel from a parallel-off relay (not illustrated) inserted between power conditioner and AC distribution board 4. Accordingly, power conditioner 6 prevents solar cell 1 and storage cell 2 from operating alone. Note that power conditioner 6 is installed inside or around AC distribution board 4.

In addition, power conditioner 6 charges and discharges storage cell 2 and sells power to an electric power company, when solar cell 1 generates excess power. by causing the excess power to reversely flow into the commercial electrical grid. Also, power conditioner 6 further includes control unit 61 configured to control these functions. In response to a control command from discharge management device 10, control unit 61 switches among a charge mode of charging storage cell 2, a discharge mode of discharging storage cell 2 and a power selling mode of selling power.

Discharge management device 10 includes demand measurement unit 11 configured to measure demand power of load 5, power generation measurement unit 12 configured to measure the power generated by solar cell 1, threshold storage unit 13 configured to store a threshold, command unit 14 configured to give a control command to control unit 61, and threshold setting unit 15 to be described later. In this embodiment, discharge management device 10 includes a microcomputer as a main component, and realizes functions of the respective units described above by executing programs stored in a memory (not illustrated).

Demand measurement unit 11 uses an output from first current sensor 111 provided on a power supply path from AC distribution board 4 to load 5 to measure an instantaneous value of power actually consumed by load 5 (an actual value of the demand power). Demand measurement unit 11 regularly transmits the measurement result to command unit 14. Note that, here, demand measurement unit 11 is configured to measure the sum of demand powers in a plurality of loads 5 (the total demand power). However, demand measurement unit 11 is not limited to such a configuration, but may be configured to measure, when load 5 is divided into a plurality of systems, for example, the demand power for each system.

Power generation measurement unit 12 uses an output from second current sensor 112 provided on a power supply path from solar cell 1 to power conditioner 6 to measure an instantaneous value of power actually generated by solar cell 1 (an actual value of the generated power). Power generation measurement unit 12 regularly transmits the measurement result to command unit 14.

Threshold storage unit 13 stores at least a discharge control threshold and a power purchase limit threshold. The discharge control threshold is a threshold for the remaining amount (amount of remaining power) of storage cell 2, which is used to determine whether to discharge storage cell 2. The power purchase limit threshold is a threshold used to limit purchased power so as to prevent a breaker from tripping when the power to be supplied to the consumer from commercial power source 3 (the purchased power) exceeds a predetermined contract capacity (current value) between the consumer and the electric power company.

Command unit 14 regularly acquires information indicating a state of storage cell 2 (hereinafter referred to as the "storage cell information") from storage cell 2. This information includes the remaining amount of storage cell 2, anomaly information such as the presence or absence of overdischarge and overcharge, and the like. Storage cell 2 regularly transmits such storage cell information not only to command unit 14 but also to power conditioner 6.

Command unit 14 generates a control command by using the demand power of load 5 measured by demand measurement unit 11, the generated power measured by power generation measurement unit 12, each of the thresholds stored in threshold storage unit 13, and the remaining amount of storage cell 2 included in the storage cell information, and then transmits the generated control command to control unit 61 of power conditioner 6. Here, the control command includes a discharge command to discharge storage cell 2, a discharge suspend command to suspend the discharge, a charge command to charge storage cell 2, a charge suspend command to suspend the charge, and a power selling command to sell power.

Upon receipt of the control command, control unit 61 checks the presence or absence of excess power in the generated power, the remaining amount of storage cell 2, and the like by using the storage cell information. Then, if there is no anomaly, control unit 61 controls charge and discharge of storage cell 2, power selling and power supply to load 5 according to the control command.

Threshold setting unit 15 has a function to set the discharge control threshold and the power purchase limit threshold, and then to write the thresholds into threshold storage unit 13. In this embodiment, threshold setting unit 15 variably (dynamically) sets the value of the discharge control threshold, and updates the discharge control threshold in threshold storage unit 13 every time the value is changed. How threshold setting unit 15 sets the discharge control threshold is described in detail later.

Herein, initial values of the discharge control threshold and power purchase limit threshold set in threshold storage unit 13 are illustrated in Table 1 below. Note, however, that the discharge control threshold is variably set and thus not fixed to the initial value.

TABLE 1

| Power Purchase Limit Threshold | 2 kW |
|---|---|
| Discharge Control Threshold | 1 kWh |

Figure 2:
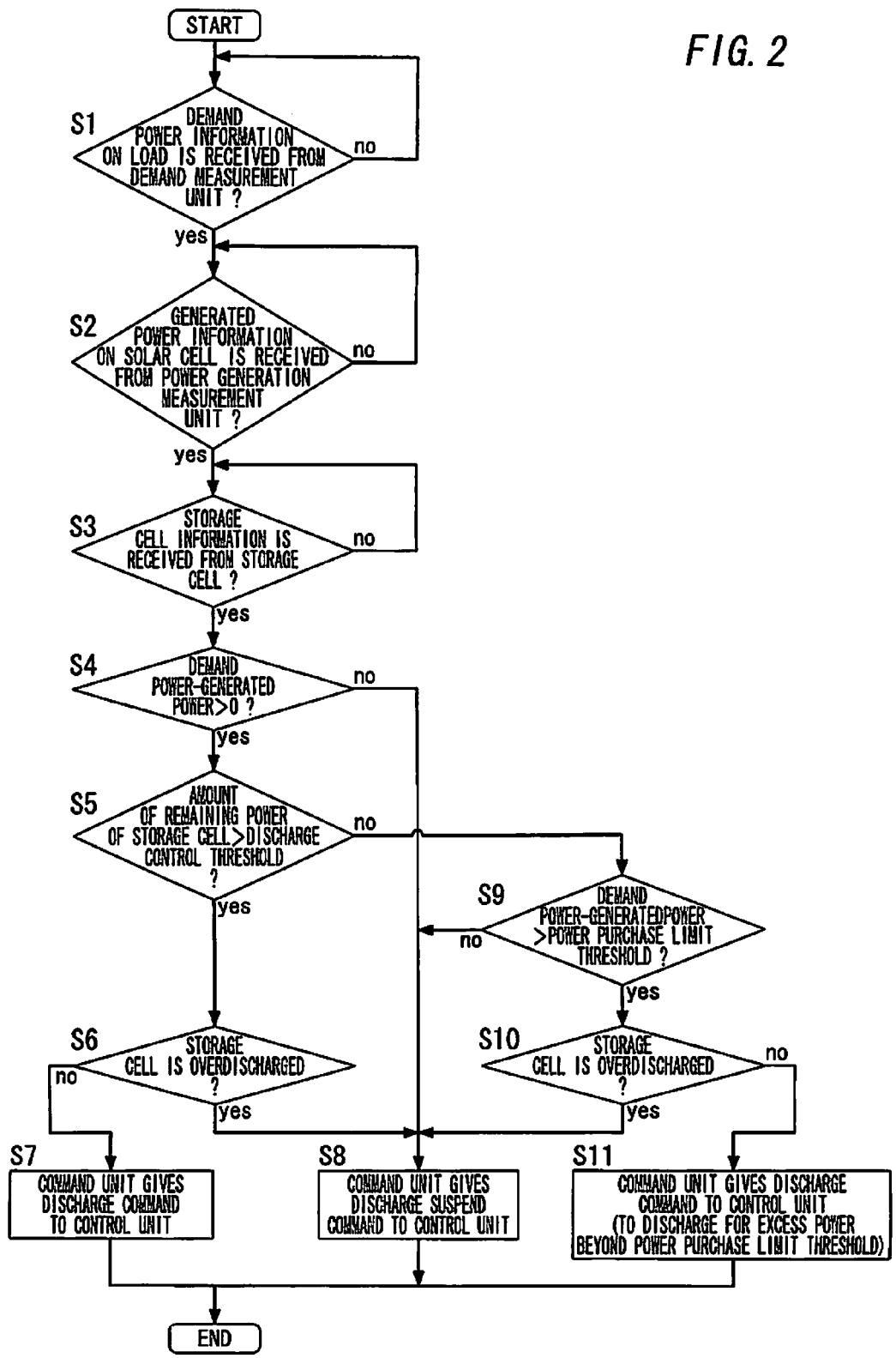
FIG. 2 is an explanatory diagram illustrating operations of a command unit in the power supply system of Embodiment 1.

Next, with reference to FIG. 2, description is given of an operation of command unit 14 giving a control command to switch between discharge of storage cell 2 and discharge suspend.

Upon receipt of information on the demand power of load 5 from demand measurement unit 11 (S1 in FIG. 2: yes), information on the power generated by solar cell 1 from power generation measurement unit 12 (S2: yes), and the storage cell information from storage cell 2 (S3: yes), command unit 14 compares the demand power with the generated power (S4).

When the demand power is larger than the generated power in "S4" (S4: yes), command unit 14 checks the remaining amount of storage cell 2 included in the storage cell information, and then compares the remaining amount of storage cell 2 with the discharge control threshold in threshold storage unit 13 (S5). Thereafter, when the remaining amount of storage cell 2 is larger than the discharge control threshold (S5: yes), command unit 14 checks the storage cell information to determine if there is overdischarge (S6). Then, if there is no overdischarge (S6: no), command unit 14 transmits a control command (discharge command) to discharge storage cell 2 to control unit 61 (S7). Accordingly, storage cell 2 can be discharged to cover a shortage (power shortage) of the generated power with respect to the demand power. However, if the power shortage cannot be fully covered even when the discharge is performed up to performance limitations of power conditioner 6, power is supplied also from commercial power source 3 to load 2.

On the other hand, when the demand power is not larger than the generated power in "S4" (S4: no), command unit 14 transmits a control command (discharge suspend command) to suspend the discharge of storage cell 2 to control unit 61 (S8).

Also, when the remaining amount of storage cell 2 is not larger than the discharge control threshold in "S5" (S5: no), command unit 14 compares the power shortage (demand power−generated power) that is the difference between the demand power and the generated power with the power purchase limit threshold in threshold storage unit 13 (S9). When the power shortage is larger than the power purchase limit threshold (S9: yes), command unit 14 checks the storage cell information to determine if there is overdischarge (S10). Then, if there is no overdischarge (S10: no), command unit 14 transmits a discharge command to control unit 61 (S11).

In this case (in the case of S10: no), however, command unit 14 limits the discharge power by the control command (discharge command) so as to discharge only the power corresponding to an excess by which the power shortage exceeds the power purchase limit threshold. In other words, in this case, storage cell 2 does not cover all but only part of the power shortage (only for the portion that exceeds the power purchase limit threshold). Then, for the rest (for the part not exceeding the power purchase limit threshold), commercial power source 3 supplies power to load 2. In other words, when the remaining amount of storage cell 2 is not larger than the discharge control threshold, storage cell 2 saves the remaining power for later use in a situation where the demand power exceeds the generated power, rather than being fully discharged to fully assist for the power shortage.

When the power shortage is not larger than the power purchase limit threshold in "S9" (S9: no), command unit 14 transmits a discharge suspend command to control unit 61 (S8). Command unit 14 transmits a discharge suspend command to control unit 61 (S8) also when there is overdischarge in "S6" or "S10" (S6: yes or S10: yes).

Figure 3:
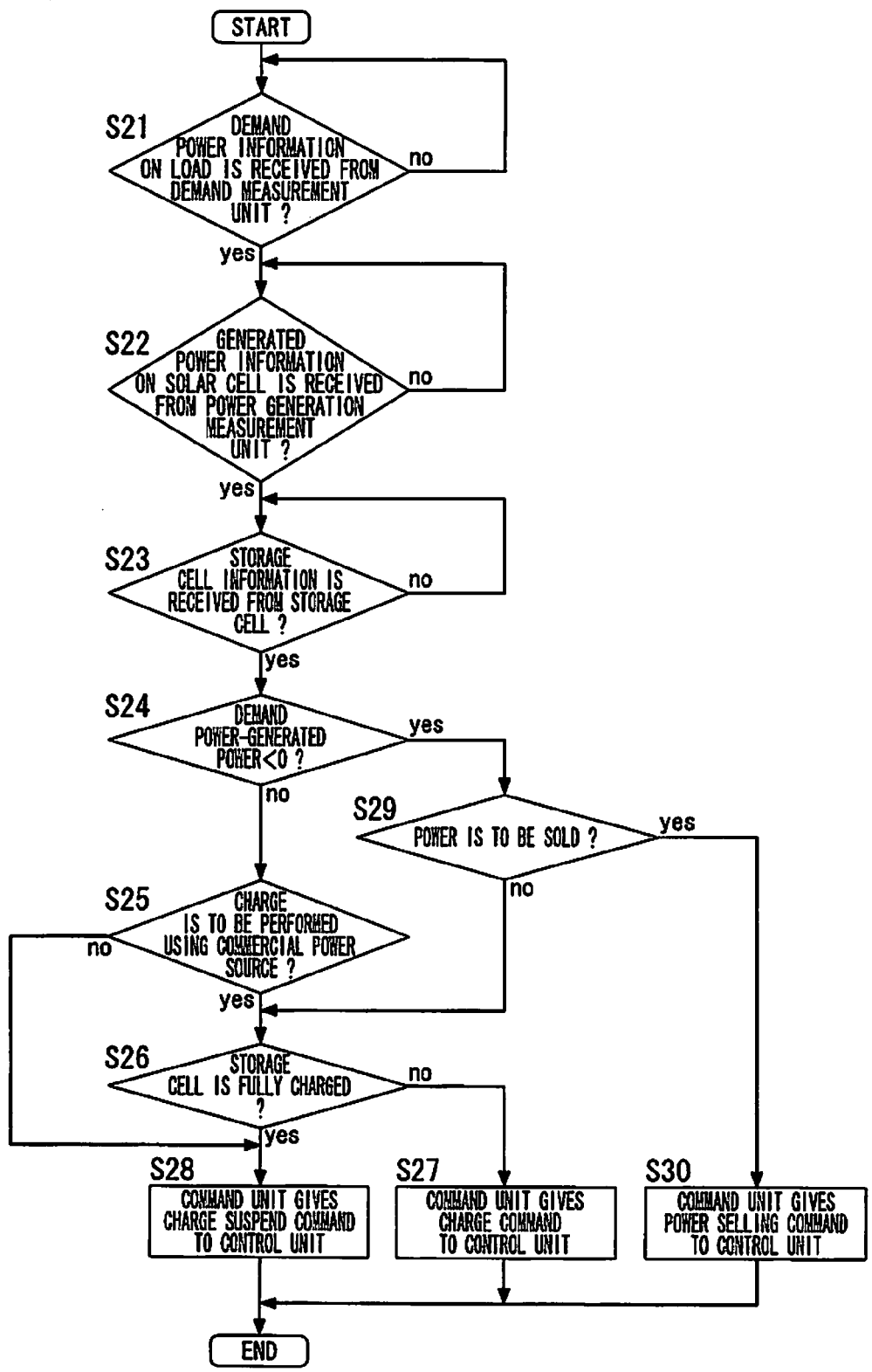
FIG. 3 is an explanatory diagram illustrating operations of the command unit in the power supply system of Embodiment 1.

Next, with reference to FIG. 3, description is given of an operation of command unit 14 giving a control command to switch between charge of storage cell 2 and charge suspend as well as between power selling and power non-selling.

Upon receipt of information on the demand power of load 5 from demand measurement unit 11 (S21 in FIG. 3: yes), information on the power generated by solar cell 1 from power generation measurement unit 12 (S22: yes), and the storage cell information from storage cell 2 (S23: yes), command unit 14 compares the demand power with the generated power (S24).

When the demand power is not smaller than the generated power in "S24" (S24: no), command unit 14 determines whether to charge storage cell 2 with the power from commercial power source 3 (S25). When the charge is performed using commercial power source 3 (S25: yes), command unit 14 checks the remaining amount of storage cell 2 included in the storage cell information to determine whether or not storage cell 2 is fully charged (S26). When storage cell 2 is not fully charged (S26: no), command unit 14 transmits a control command (charge command) to charge storage cell 2 to control unit 61 (S27).

On the other hand, when storage cell 2 is fully charged (S26: yes), command unit 14 transmits a control command (charge suspend command) to suspend the charge of storage cell 2 to control unit 61 (S28). Command unit 14 transmits the charge suspend command to control unit 61 (S28) also when it is determined in "S25" that the charge using commercial power source 3 is not to be performed (S25: no).

Meanwhile, when the demand power is smaller than the generated power in "S24" (S24: yes), that is, when there is an excess (excess power) in the power generated by solar cell 1, command unit 14 determines whether to perform the charge (S29). When the charge is to be performed (S29: yes), command unit 14 transmits a control command (power selling command) to start power selling to control unit 31 (S30). On the other hand, when the charge is not to be performed (S29: no), command unit 14 moves to determination of whether or not storage cell 2 is fully charged (S26). In this case, when storage cell 2 is not fully charged (S26: no), command unit 14 transmits a control command (charge command) to charge storage cell 2 with the excess power of solar cell 1 to control unit 61 (S27).

Figure 4:
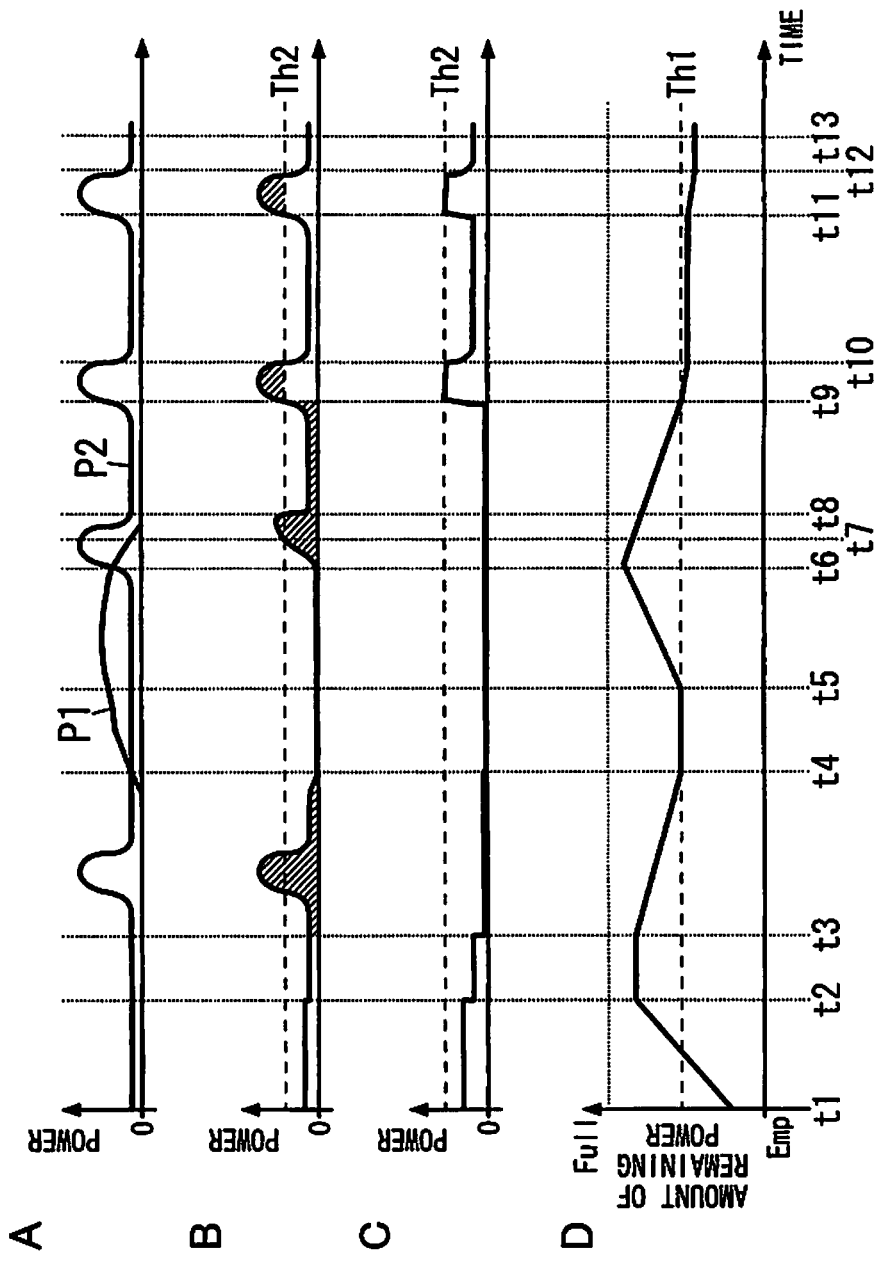
FIG. 4 is an explanatory diagram illustrating operations of the power supply system of Embodiment 1.

With reference to FIG. 4, description is given below of a specific operation example of the power supply system having the above configuration.

In FIG. 4, with the horizontal axis as the time axis, (a) illustrates generated power P1 and demand power P2, (b) illustrates power supplied from commercial power source 3 without assist by storage cell 2, (c) illustrates power supplied from commercial power source 3 with assist by storage cell 2, and (d) illustrates the remaining amount of storage cell 2. Note that "Th1" in FIG. 4 (d) denotes a discharge control threshold, while "Th2" in FIGS. 4 (b) and (c) denotes a power purchase limit threshold. Also, in FIG. 4, it is assumed that a period from t3 to t13 is a time slot in which a regular electric power rate is applied, while a period from t1 to t3 is a time slot in which a lower electric power rate (a night rate) is applied.

At time t1, even though generated power P1 is smaller than demand power P2, the remaining amount of storage cell 2 is smaller than discharge control threshold Th1 and thus the night rate is applied. Therefore, in a period between t1 and t2, power conditioner 6 charges storage cell 2 by using the power from commercial power source 3. In a period between t2 and t3, the night rate is applied even though the remaining amount of storage cell 2 exceeds discharge control threshold Th1. Thus, power conditioner 6 actively supplies power from commercial power source 3 to the load.

Then, the regular electric power rate is applied after time t3, and in a period between t3 and t4, generated power P1 is smaller than demand power P2 and the remaining amount of storage cell 2 is larger than discharge control threshold Th1. Thus, power conditioner 6 fully addresses the power shortage by fully discharging storage cell 2. More specifically, when generated power P1 is 0.8 kW, demand power P2 is 2.9 kW, and the remaining amount of storage cell 2 is 1.5 kWh, which is larger than discharge control threshold Th1 (=1 kWh), for example, power conditioner 6 fully discharges storage cell 2 so as to alleviate the power shortage as much as possible. Since the period between t7 and t9 also meets the same conditions as those met in the period between t3 and t4, power conditioner 6 fully addresses the power shortage by fully discharging storage cell 2. Note that the shaded area in FIG. 4 (b) denotes an increase in the power supplied from commercial power source 3 when compared to the case with assist by storage cell 2 (FIG. 4 (c)), that is, a portion of the power supplied from commercial power source 3, which can be cut back by the assist by storage cell 2.

Also, in a period between t4 and t5, generated power P1 is larger than demand power P2, and power can be sold. Thus, power conditioner 6 sells all excess power of solar cell 1. Then, in a period between t5 and t6, even though generated power P1 is larger than demand power P2, the period falls in a time slot for suppressed power selling. Thus, power conditioner 6 uses all the excess power of solar cell 1 to charge storage cell 2.

In a period between t9 and t10, even though the remaining amount of storage cell 2 is smaller than discharge control threshold Th1, the power shortage (demand power P2−generated power P1) is larger than power purchase limit threshold Th2. Thus, power conditioner 6 alleviates the power shortage by discharging storage cell 2. In this event, power conditioner 6 assists only for an excess by which the power shortage exceeds power purchase limit threshold Th2, by discharging storage cell 2, and supplies power from commercial power source 3 for the rest. Since a period between t11 and t12 also meets the same conditions as those met in the period between t9 and t10, power conditioner 6 partially assists handling the power shortage by discharging storage cell 2.

In short, assuming that generated power P1 is 0.8 kW and demand power P2 is 2.9 kW, the power shortage is 2.1 (=2.9−0.8) kW, which turns out to be larger than power purchase limit threshold Th2 that is 2 kW. In this case, even though the remaining amount of storage cell 2 is 0.8 kWh and is smaller than discharge control threshold Th1, power conditioner 6 supplies 0.1 (2.1−2.0) kW by which the power shortage exceeds power purchase limit threshold Th2, from storage cell 2 and the remaining 2.0 kW from commercial power source 3.

If power conditioner 6 fully charges storage cell 2 in the period between t9 and t10, there is a possibility that the remaining amount of storage cell 2 runs short the next time power shortage exceeds power purchase limit threshold Th2 (the period between t11 and t12). For this reason, in the period between t11 and t12, there is a possibility that power conditioner 6 cannot assist by discharging storage cell 2 and the purchased power exceeds the contract capacity, causing the breaker to trip and suspension of power supply to load 5. In this embodiment, on the other hand, power conditioner 6 assists only for the excess by which the power shortage exceeds power purchase limit threshold Th2, by discharging storage cell 2. Thus, the remaining power of storage cell 2 can be saved for later use in a situation where the demand power exceeds the generated power.

In a period between t10 and t11 and a period between t12 and t13, generated power P1 is smaller than demand power P2, the remaining amount of storage cell 2 is smaller than discharge control threshold Th1, and the power shortage is not larger than power purchase limit threshold Th2. Thus, power conditioner 6 suspends the charge and discharge of storage cell 2. More specifically, assuming that generated power P1 is 1.2 kW and demand power P2 is 2.9 kW, for example, the power shortage is 1.7 (=2.9−1.2) kW, which turns out to be smaller than power purchase limit threshold Th2, that is, 2 kW. Thus, power conditioner 6 suspends the discharge of storage cell 2.

Incidentally, in the power supply system of this embodiment, threshold setting unit 15 sets the discharge control threshold variably (dynamically) rather than in a fixed manner, and writes the set threshold into threshold storage unit 13 as needed. How specifically threshold setting unit 15 sets the discharge control threshold is described below.

Figure 5:
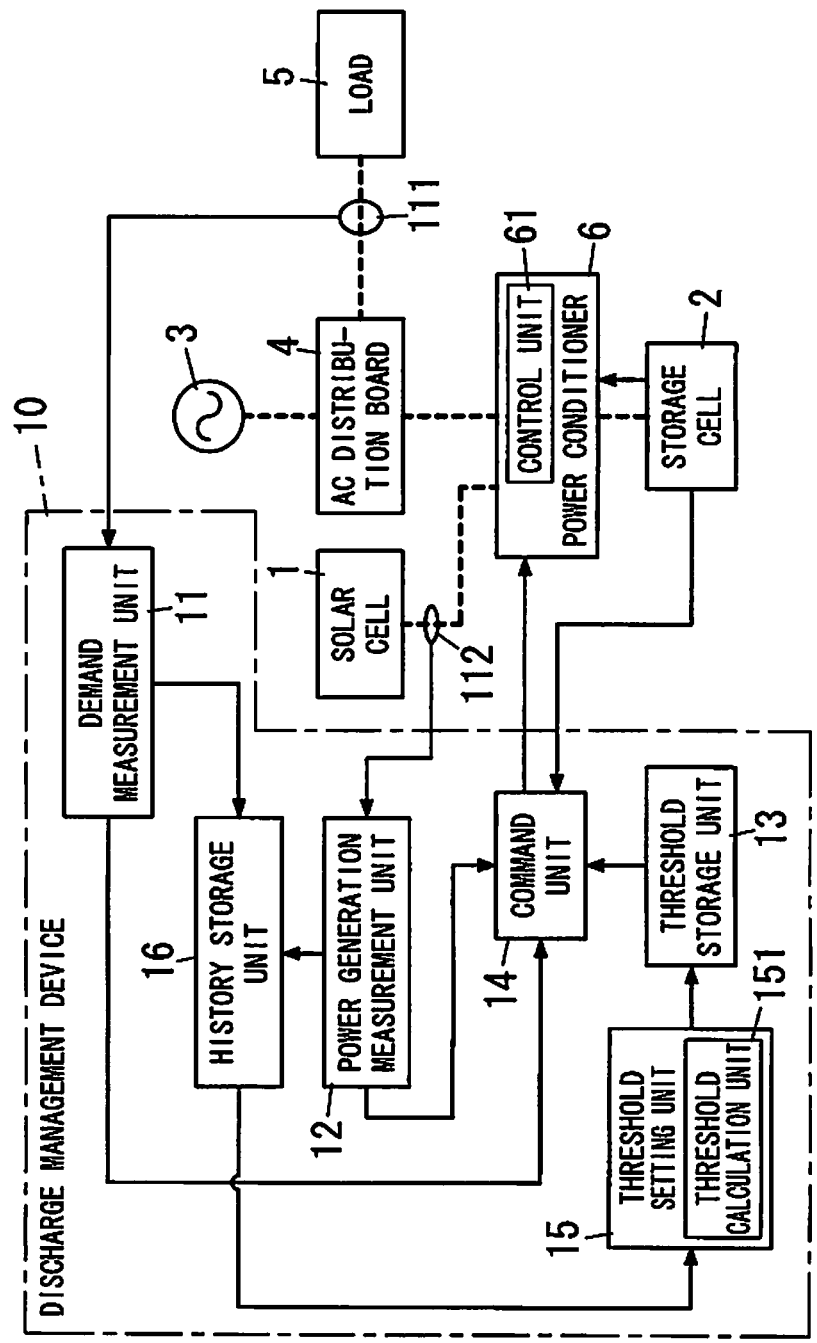
FIG. 5 is a block diagram illustrating the configuration of the power supply system of Embodiment 1.

Specifically, discharge management device 10 further includes history storage unit 16 configured to store information on the demand power and generated power in the past as history information as illustrated in FIG. 5, in addition to the above configuration.

History storage unit 16 periodically receives information indicating the demand power from demand measurement unit 11, and stores the information as a history table by date/hour (date and hour) as illustrated in Table 2 below. Similarly, history storage unit 16 periodically receives information indicating the generated power from power generation measurement unit 12, and stores the information as a history table by date and hour as illustrated in Table 2 below. Here, history storage unit 16 acquires the information on both of the demand power and the generated power at intervals of one hour, and stores an average power of each hour (an hourly average value of instantaneous values of the power) in the history table. With at least a certain period of time (for example, one week) in the past as a measurement period, history storage unit 16 constantly stores the information (history information) on the demand power and generated power acquired within the measurement period, and deletes the information in the chronological order, oldest first.

TABLE 2

|  |  |  | Hourly Average Power | | | | |
| --- | --- | --- | --- | --- | --- | --- | --- |
| Date | Type of Information | . . . :00 | 11:00 | 12:00 | 13:00 | 14:00 | . . . :00 |
| March 9 | Demand Power (kW) | . . . | 0.1 | 3.5 | 1.2 | 0.5 | . . . |
|  | Generated Power (kW) | . . . | 0 | 0 | 0 | 0 | . . . |
| March 10 | Demand Power (kW) | . . . | 0.3 | 3 | 1 | 0.5 | . . . |
|  | Generated Power (kW) | . . . | 0 | 0 | 0 | 0 | . . . |
| March 11 | Demand Power (kW) | . . . | 0.5 | 3.1 | 0.9 | 0.4 | . . . |
|  | Generated Power (kW) | . . . | 0 | 0 | 0 | 0 | . . . |
| March 12 | Demand Power (kW) | . . . | 0.1 | 3.6 | 0.4 | 0.4 | . . . |
|  | Generated Power (kW) | . . . | 0 | 0 | 0 | 0 | . . . |
| March 13 | Demand Power (kW) | . . . | 0.5 | 3.4 | 0.9 | 0.4 | . . . |
|  | Generated Power (kW) | . . . | 0 | 2 | 2 | 0.5 | . . . |
| March 14 | Demand Power (kW) | . . . | 0.3 | 3.6 | 1 | 0.4 | . . . |
|  | Generated Power (kW) | . . . | 0.1 | 2 | 1.4 | 0.6 | . . . |
| March 15 | Demand Power (kW) | . . . | 0.2 | 3.4 | 3.1 | 0.3 | . . . |
|  | Generated Power (kW) | . . . | 0.1 | 2 | 1.4 | 0.6 | . . . |
| March 16 | Demand Power (kW) | . . . | 0.3 | 3.3 | 3 | 0.5 | . . . |
|  | Generated Power (kW) | . . . | 0.1 | 2 | 1.4 | 0.7 | . . . |
| March 17 | Demand Power (kW) | . . . | 0.3 | 3.2 | 2.9 | 0.6 | . . . |
|  | Generated Power (kW) | . . . | 0.9 | 1.4 | 1 | 1 | . . . |
| March 18 | Demand Power (kW) | . . . | 0.1 | 3.1 | 2.1 | 0.5 | . . . |
|  | Generated Power (kW) | . . . | 0 | 0 | 0 | 0 | . . . |
| March 19 | Demand Power (kW) | . . . | 0.5 | 3.5 | 3.2 | 0.5 | . . . |
|  | Generated Power (kW) | . . . | 0 | 0 | 0 | 0 | . . . |
| March 20 | Demand Power (kW) | . . . | 0.7 | 3.1 | 2.8 | 0.5 | . . . |
|  | Generated Power (kW) | . . . | 0.1 | 2 | 1.3 | 0.3 | . . . |
| March 21 | Demand Power (kW) | . . . | 0.5 | 3.2 | 2.9 | 0.4 | . . . |
|  | Generated Power (kW) | . . . | 0.3 | 2 | 0.7 | 0.5 | . . . |
| March 22 | Demand Power (kW) | . . . | 0.3 | 3.1 | 2.8 | 0.5 | . . . |
|  | Generated Power (kW) | . . . | 0 | 0 | 0 | 0 | . . . |
| March 23 | Demand Power (kW) | . . . | 0.2 | 3 | 2.7 | 0.5 | . . . |
|  | Generated Power (kW) | . . . | 0.1 | 1.9 | 1.4 | 0.7 | . . . |

History storage unit 16 periodically transmits the history information stored for the measurement period to threshold setting unit 15. In this embodiment, at the fixed time (for example, at 23 o'clock) every day, history storage unit 16 transmits the history information for one week back from that point to threshold setting unit 15.

Threshold setting unit 15 includes threshold calculation unit 151 configured to calculate a discharge control threshold by using the history information upon each acquisition thereof from history storage unit 16. Then, threshold setting unit 15 writes the discharge control threshold calculated by threshold calculation unit 151 into threshold storage unit 13. Thus, threshold setting unit 15 dynamically sets the discharge control threshold rather than fixing the value to its initial value. Note that, as for the power purchase limit threshold, a user sets a value by operating an operation member (not illustrated) of threshold setting unit 15 at an arbitrary timing based on a predetermined contract capacity between the consumer and the electric power company, and then writes the value into threshold storage unit 13. The operation member of threshold setting unit 15 may be a dip switch, keyboard, touch panel display and the like, or may be of voice input type.

Figure 6:
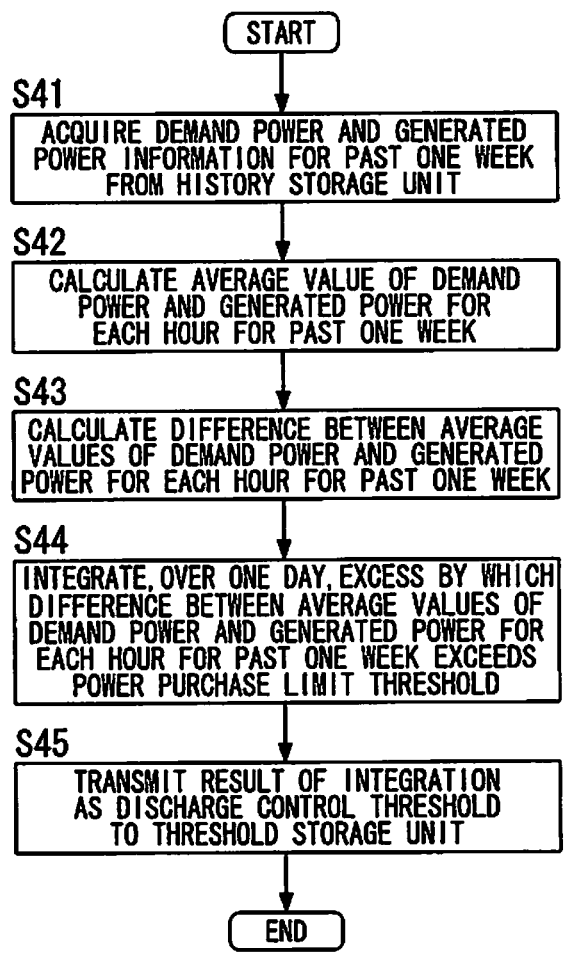
FIG. 6 is an explanatory diagram illustrating operations of a threshold setting unit in the power supply system of Embodiment 1.

Next, with reference to FIG. 6, description is given of an operation of threshold setting unit 15 setting the discharge control threshold. At preset time every day, threshold setting unit 15 sets a discharge control threshold to be used from the next day according to the flowchart in FIG. 6. Here, description is given of the case, as an example, where threshold setting unit 15 sets a discharge control threshold for the next day (March 24) at 23 o'clock on March 23 in the example of Table 2.

At the fixed time (23 o'clock), threshold setting unit 15 first acquires information (history information) on demand power and generated power within a measurement period (for the past one week) from history storage unit 16 (S41 in FIG. 6). Here, with the current date and hour being 23 o'clock of March 23, data for the past one week is the data of 23:00 of March 16 to 22:00 of March 23. Then, threshold setting unit 15 causes threshold calculation unit 151 to calculate an average value of the data on each of the demand power and generated power for the past one week for each hour by using the acquired history information (S42). In the example of Table 2, average values for one week from 23:00 of March 16 to 22:00 of March 23 in 11:00 to 12:00, for example, are 0.37 kW for the demand power and 0.2 kW for the generated power.

Thereafter, threshold setting unit 15 calculates, for each hour, a difference between the average value of the demand power and the average value of the generated power (that is, an average value of power shortage), which are obtained by threshold calculation unit 151 (S43). In the example of Table 2, the difference is 0.17 kW in 11:00 to 12:00, 2.1 kW in 12:00 to 13:00, 2.1 kW in 13:00 to 14:00, and 0.14 kW in 14:00 to 15:00. Then, threshold setting unit 15 causes threshold calculation unit 151 to integrate the excess by which the difference (the average value of power shortage) thus obtained for each hour exceeds the power purchase limit threshold, over one day (24 hours) (S44).

Subsequently, threshold setting unit 15 transmits a power amount (kWh) that is the result of the integration in "S44" to threshold storage unit 13 as the discharge control threshold (S45). In the example of Table 2, when the power purchase limit threshold is 2 kW, the average value of power shortage exceeds the power purchase limit threshold by 0.1 kW in 12:00 to 13:00 and 0.1 kW in 13:00 to 14:00. Thus, the total sum thereof for 24 hours is stored as a new discharge control threshold in threshold storage unit 13.

Note that the measurement period is not limited to 1 week but is arbitrarily set to 3 days, 1 month or the like, for example. Also, history storage unit 16 is not limited to the configuration of acquiring and storing the demand power and the generated power on a 1-hour basis, but may be configured to acquire and store by any time unit such as on a 1-minute basis or 10-minute basis, for example.

According to the power supply system of this embodiment described above, when the demand power exceeds the generated power (that is, when there is a power shortage), the discharge of storage cell 2 is controlled based on the result of comparison between the remaining amount of storage cell 2 and the dynamic discharge control threshold. Thus, stable power supply to load 5 can be achieved.

More specifically, with the configuration in which storage cell 2 is always discharged when the demand power exceeds the generated power, the power supply system may fall into a situation where the power shortage exceeds the contract power in a state where there is no more power left in storage cell 2 after the demand power constantly exceeds the generated power. In this case, the power supply system cannot cover the power shortage with storage cell 2 and can no longer keep the power supply to load 5 since the purchased power exceeds the contract capacity, resulting in tripping of the breaker. In the power supply system of this embodiment, on the other hand, command unit 14 determines whether to perform the discharge in consideration of the result of comparison between the remaining amount of storage cell 2 and the variably set discharge control threshold, rather than unconditionally discharging storage cell 2, even when the demand power exceeds the generated power. Therefore, the power supply system of this embodiment can avoid the remaining amount of storage cell 2 from running short according to circumstances of the moment, and can keep the stable power supply to load 5 while preventing the purchased power from exceeding the contract capacity.

To be more specific, command unit 14 gives a command to discharge storage cell 2 when the remaining amount of storage cell 2 is larger than the discharge control threshold. Thus, if there is enough power left in storage cell 2, the purchased power can be minimized by discharging storage cell 2.

Also, command unit 14 gives a command to suspend the discharge of storage cell 2 when the remaining amount of storage cell 2 is not larger than the discharge control threshold and the power shortage is not larger than the power purchase limit threshold. Thus, the remaining power of storage cell 2 can be saved for later use to cope with a situation such as where the power shortage exceeds the contract power.

In addition, command unit 14 gives a command to discharge storage cell 2 if the power shortage is larger than the power purchase limit threshold even when the remaining amount of storage cell 2 is not larger than the discharge control threshold. This makes it possible to preferentially avoid a situation where the purchased power exceeds the contract power even when there is not much power left in storage cell 2. Therefore, the power supply system can prevent the breaker from tripping when the purchased power exceeds the contract capacity, and thus can achieve stable power supply to load 5.

Furthermore, in such a case (when the power shortage is larger than the power purchase limit threshold), command unit 14 limits the power to be discharged from storage cell 2 so that storage cell 2 covers only the excess of the power shortage, which exceeds the power purchase limit threshold. Thus, the remaining amount of storage cell 2 can be saved compared with the case of full charge. Therefore, the power supply system can more easily cope later with a situation such as where the power shortage exceeds the contract power amount. The system also has an advantage that the power of storage cell 2 can be prevented from reversely flowing into commercial power source 3.

Meanwhile, threshold setting unit 15 calculates the discharge control threshold by using the history information (the demand power and the generated power) acquired within the measurement period in the past. Thus, the discharge control threshold can be dynamically changed based on actual trends of the demand power and generated power. Therefore, compared with the configuration in which the discharge of storage cell 2 is controlled using the predetermined discharge control threshold, the power supply system can utilize storage cell 2 while properly maintaining the remaining amount of storage cell 2 in just the right amount. Consequently, the power supply system can realize efficient power supply to the load.

Note that the description has been given by taking, as an example, the case where the power generator is solar cell 1 in this embodiment. However, the invention is not limited to this example, but the power generator may be a wind power generator, a fuel cell or the like, for example.

information (information indicating the current actual weather) and weather forecast information (information forecasting the weather in the future) from a server on the Internet. Here, weather information acquisition unit 17 can set a target area in advance, and acquires weather information and weather forecast information on the set area. Note that the weather information and the weather forecast information include at least "sunny", "cloudy" and "rain", and may also include temperature, wind conditions, and the like.

Weather information acquisition unit 17 periodically transmits the acquired weather information to history storage unit 16. History storage unit 16 periodically (here, at 1-day intervals) receives the weather information from weather information acquisition unit 17, and stores the received weather information together with history information as a history table at daily intervals as illustrated in Table 3 below. In other words, history storage unit 16 stores history information (demand power and generated power) for each of the weather types, "sunny", "cloudy" and "rain".

TABLE 3

| Date | Weather Information | Type of Information | Hourly Average Power | | | | | |
|---|---|---|---|---|---|---|---|---|
| | | | ... :00 | 11:00 | 12:00 | 13:00 | 14:00 | ... :00 |
| March 9 | Rain | Demand Power (kW) | ... | 0.1 | 3.5 | 1.2 | 0.5 | ... |
| | | Generated Power (kW) | ... | 0 | 0 | 0 | 0 | ... |
| March 10 | Rain | Demand Power (kW) | ... | 0.3 | 3 | 1 | 0.5 | ... |
| | | Generated Power (kW) | ... | 0 | 0 | 0 | 0 | ... |
| March 11 | Rain | Demand Power (kW) | ... | 0.5 | 3.1 | 0.9 | 0.4 | ... |
| | | Generated Power (kW) | ... | 0 | 0 | 0 | 0 | ... |
| March 12 | Rain | Demand Power (kW) | ... | 0.1 | 3.6 | 0.4 | 0.4 | ... |
| | | Generated Power (kW) | ... | 0 | 0 | 0 | 0 | ... |
| March 13 | Cloudy | Demand Power (kW) | ... | 0.5 | 3.4 | 0.9 | 0.4 | ... |
| | | Generated Power (kW) | ... | 0 | 2 | 2 | 0.5 | ... |
| March 14 | Sunny | Demand Power (kW) | ... | 0.3 | 3.6 | 1 | 0.4 | ... |
| | | Generated Power (kW) | ... | 0.1 | 2 | 1.4 | 0.6 | ... |
| March 15 | Cloudy | Demand Power (kW) | ... | 0.2 | 3.4 | 3.1 | 0.3 | ... |
| | | Generated Power (kW) | ... | 0.1 | 2 | 1.4 | 0.6 | ... |
| March 16 | Sunny | Demand Power (kW) | ... | 0.3 | 3.3 | 3 | 0.5 | ... |
| | | Generated Power (kW) | ... | 0.1 | 2 | 1.4 | 0.7 | ... |
| March 17 | Cloudy | Demand Power (kW) | ... | 0.3 | 3.2 | 2.9 | 0.6 | ... |
| | | Generated Power (kW) | ... | 0.9 | 1.4 | 1 | 1 | ... |
| March 18 | Rain | Demand Power (kW) | ... | 0.1 | 3.1 | 2.1 | 0.5 | ... |
| | | Generated Power (kW) | ... | 0 | 0 | 0 | 0 | ... |
| March 19 | Rain | Demand Power (kW) | ... | 0.5 | 3.5 | 3.2 | 0.5 | ... |
| | | Generated Power (kW) | ... | 0 | 0 | 0 | 0 | ... |
| March 20 | Sunny | Demand Power (kW) | ... | 0.7 | 3.1 | 2.8 | 0.5 | ... |
| | | Generated Power (kW) | ... | 0.1 | 2 | 1.3 | 0.3 | ... |
| March 21 | Cloudy | Demand Power (kW) | ... | 0.5 | 3.2 | 2.9 | 0.4 | ... |
| | | Generated Power (kW) | ... | 0.3 | 2 | 0.7 | 0.5 | ... |
| March 22 | Rain | Demand Power (kW) | ... | 0.3 | 3.1 | 2.8 | 0.5 | ... |
| | | Generated Power (kW) | ... | 0 | 0 | 0 | 0 | ... |
| March 23 | Sunny | Demand Power (kW) | ... | 0.2 | 3 | 2.7 | 0.5 | ... |
| | | Generated Power (kW) | ... | 0.1 | 1.9 | 1.4 | 0.7 | ... |

Embodiment 2

Figure 7:
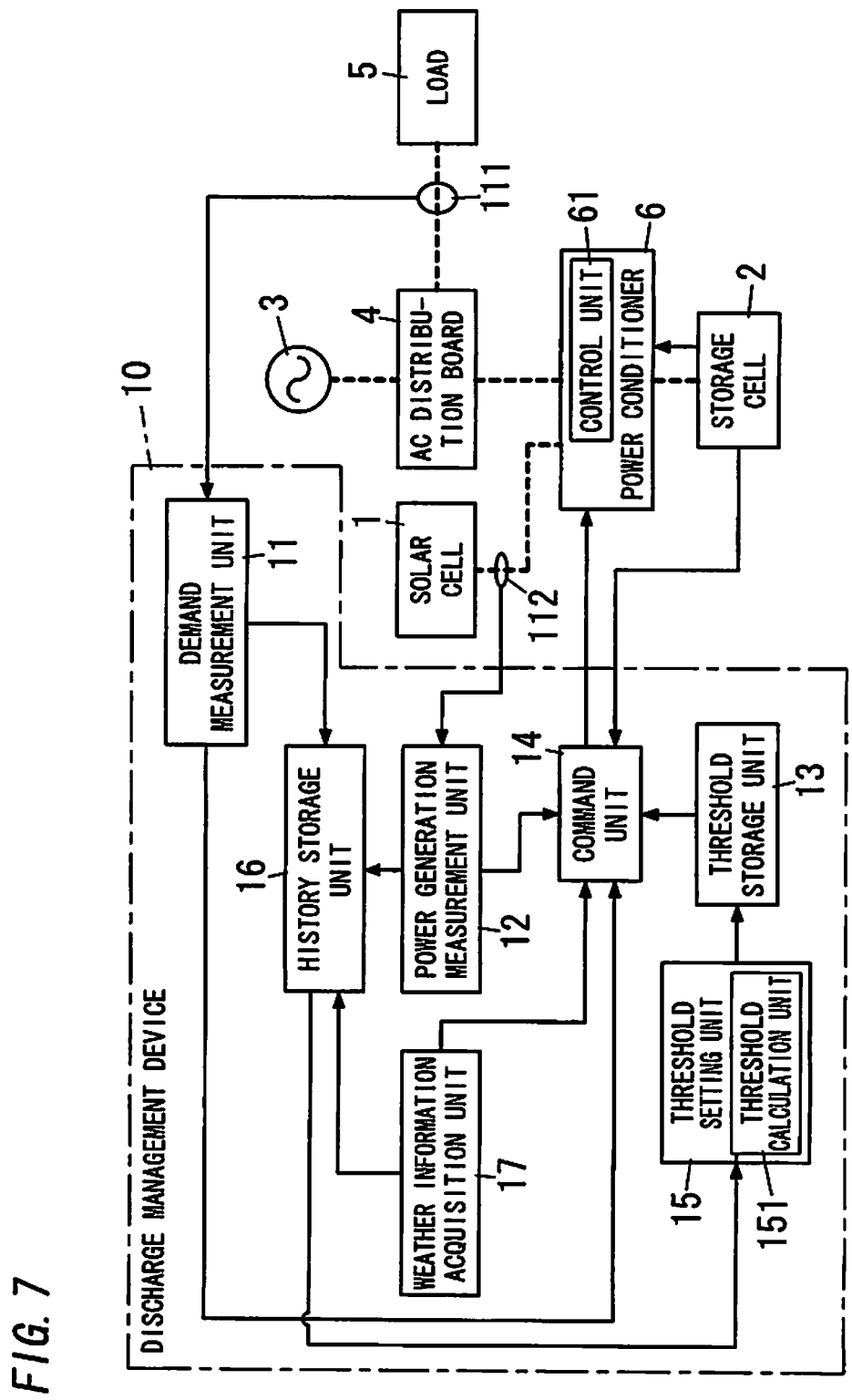
FIG. 7 is a block diagram illustrating a schematic configuration of a power supply system of Embodiment 2.

A power supply system of this embodiment is different from the power supply system of Embodiment 1 in that discharge management device 10 includes weather information acquisition unit 17 configured to acquire weather information as illustrated in FIG. 7. Hereinafter, the same constituent components as those of Embodiment 1 are denoted by the same reference numerals, and description thereof is omitted accordingly.

Weather information acquisition unit 17 is connected to the Internet, for example, and periodically acquires weather History storage unit 16 periodically transmits the stored history information for each of the weather categories to threshold setting unit 15. In this embodiment, at the fixed time (for example, at 23 o'clock) every day, history storage unit 16 transmits the history information for 7 days (1 week) back from that point for each weather type to threshold setting unit 15.

Threshold setting unit 15 causes threshold calculation unit 151 to calculate a discharge control threshold by using the history information for each weather type upon each acquisition thereof from history storage unit 16. Then, threshold setting unit 15 writes the calculated discharge control threshold for each weather type into threshold storage unit 13.

Accordingly, threshold storage unit 13 stores a plurality of discharge control thresholds set for the respective weather categories.

Meanwhile, weather information acquisition unit 17 transmits the acquired future weather forecast information to command unit 14 at the fixed time (for example, 23 o'clock) every day. Command unit 14 periodically receives the weather forecast information from weather information acquisition unit 17, then selects a discharge control threshold corresponding to the received weather forecast information about the next day from among the discharge control thresholds stored in threshold storage unit 13, and uses the selected discharge control threshold. To be more specific, if the weather forecast for the next day is "rain", command unit 14 selects a discharge control threshold corresponding to "rain" (for a rainy day) from among the discharge control thresholds stored in threshold storage unit 13, and determines control command contents by using the selected discharge control threshold the next day.

Next, description is given of an operation of threshold setting unit 15 setting a discharge control threshold by taking a specific example. The operation of threshold setting unit 15 is basically the same as that illustrated in FIG. 6 described in Embodiment 1. Here, description is given of the case, as an example, where threshold setting unit 15 sets a discharge control threshold for a rainy day at 23 o'clock on March 23 in the example of Table 3.

At the fixed time (23 o'clock), threshold setting unit 15 first acquires information (history information) on demand power and generated power for the past 7 days for each weather type from history storage unit 16. Here, with the current date and hour being 23 o'clock of March 23, rainy day data for the past 7 days is the data of 0:00 to 23:00 of March 9, 10, 11, 12, 18, 19 and 22. Then, threshold setting unit 15 causes threshold calculation unit 151 to calculates an average value of the data on each of the demand power and generated power for the past 7 days for each hour by using the history information acquired for each weather type. In the example of Table 3, average values for the past 7 days in 11:00 to 12:00 on a rainy day, for example, are 0.27 kW for the demand power and 0 kW for the generated power.

Thereafter, threshold setting unit 15 calculates, for each hour, a difference between the average value of the demand power and the average value of the generated power, which are obtained for each weather type by threshold calculation unit 151. In the example of Table 3, the difference is 0.27 kW in 11:00 to 12:00 on a rainy day, 3.3 kW in 12:00 to 13:00, 1.7 kW in 13:00 to 14:00, and 0.47 kW in 14:00 to 15:00. Then, threshold setting unit 15 causes threshold calculation unit 151 to integrate the excess by which the difference for each hour thus obtained for each weather type exceeds the power purchase limit threshold, over 24 hours. Subsequently, threshold setting unit 15 transmits a power amount (kWh) that is the result of the integration to threshold storage unit 13 as a discharge control threshold for each weather type. In the example of Table 3, when the power purchase limit threshold is 2 kW, the average value of power shortage on a rainy day exceeds the power purchase limit threshold by 1.3 kW in 12:00 to 13:00. Thus, the total sum thereof for 24 hours is stored as a new discharge control threshold on a rainy day in threshold storage unit 13.

According to the power supply system of this embodiment described above, threshold setting unit 15 calculates the discharge control threshold by using not only the history information (demand power and generated power) acquired in the past but also the weather information. Thus, the discharge control threshold can be dynamically changed based on more accurate trends. In other words, in a power generator, such as solar cell 1, which generates power by using natural energy (solar light) and whose generated power varies depending on the weather, the trends of the demand power and generated power are significantly influenced by the weather. Therefore, as described above, threshold setting unit 15 sets the discharge control threshold for each weather type, and command unit 14 selects and uses the discharge control threshold corresponding to the weather forecast information. Thus, the power supply system can more properly utilizes storage cell 2, and can realize more efficient power supply to the load.

Note that, when the power generator is not solar cell 1 but a wind power generator, for example, it is preferable that the weather information and weather forecast information include directions of the wind and wind speeds, and that threshold setting unit 15 sets the discharge control threshold for each direction of the wind and each wind speed. In this case, threshold setting unit 15 classifies the directions of the wind and the wind speeds into several categories, and sets the discharge control threshold for each category. In this way, the information included in the weather information (weather forecast information) is set according to the power generator.

The other configuration and functions are the same as those of Embodiment 1.

As described above, the power supply systems of Embodiments 1 and 2 each include the power generator and the storage cell. The power generator is configured to generate power, while the storage cell is configured to store the power.

The power supply system includes the demand measurement unit, the power generation measurement unit, the threshold storage unit, the command unit, the control unit and the threshold setting unit. The demand measurement unit is configured to measure the demand power of the load. The power generation measurement unit measures the power generated by the power generator. The threshold storage unit stores the discharge control threshold to determine whether to discharge the storage cell. The command unit outputs a control command to control the discharge of the storage cell based on the result of comparison between the remaining amount of the storage cell and the discharge control threshold, when the demand power is larger than the generated power. The control unit controls the discharge of the storage cell in response to the control command from the command unit. The threshold setting unit variably sets the discharge control threshold, and writes the set threshold into the threshold storage unit.

In this case, when the demand power is larger than the generated power, the discharge of the storage cell is controlled based on the result of the comparison between the remaining amount of the storage cell and the variably set discharge control threshold. Therefore, stable power supply to the load can be achieved.

The command unit is configured to compare the remaining amount of the storage cell with the discharge control threshold.

The command unit gives a control command to discharge the storage cell when the remaining amount of the storage cell is larger than the discharge control threshold.

In other words, the command unit has a control unit configured to give the control command to discharge the storage cell when the remaining amount of the storage cell is larger than the discharge control threshold.

When the demand power is larger than the generated power and the remaining amount of the storage cell is larger than the discharge control threshold, the command unit has a control unit configured to give the control command to discharge the storage cell.

The command unit has a determination unit configured to determine whether or not the storage cell is in an overdischarged state. When the storage cell is in the overdischarged state, the command unit has a control unit configured to give a control command to suspend discharge of the storage cell.

The command unit has a determination unit configured to determine whether or not the storage cell is in an overdischarged state. When the storage cell is not in the overdischarged state, the command unit has a control unit configured to give the control command to discharge the storage cell.

The command unit has a determination unit configured to determine whether or not the storage cell is in an overdischarged state, based on storage cell information indicating whether or not the storage cell is in the overdischarged state.

Meanwhile, the storage cell has the storage cell information. The storage cell information indicates whether or not the storage cell is in the overdischarged state.

When the following conditions are met, the command unit outputs the control command to suspend the discharge of the storage cell.

The first condition is that the remaining amount of the storage cell is not larger than the discharge control threshold.

The second condition is that the difference between the demand power and the generated power is not larger than a predetermined power purchase limit threshold.

In other words, when the following conditions are met, the command unit has a control unit configured to output the control command to suspend the discharge of the storage cell.

The first condition is that the remaining amount of the storage cell is not larger than the discharge control threshold.

The second condition is that the difference between the demand power and the generated power is not larger than a predetermined power purchase limit threshold.

In other words, when the following conditions are met, the command unit outputs the control command to discharge the storage cell.

The first condition is that the remaining amount of the storage cell is not larger than the discharge control threshold.

The second condition is that the difference between the demand power and the generated power is larger than the predetermined power purchase limit threshold.

In other words, when the following conditions are met, the command unit has a control unit configured to output the control command to discharge the storage cell.

The first condition is that the remaining amount of the storage cell is not larger than the discharge control threshold.

The second condition is that the difference between the demand power and the generated power is larger than the predetermined power purchase limit threshold.

Also, when the following conditions are met, the command unit limits discharged power by the control command so as to discharge only the power corresponding to an excess by which the difference exceeds the power purchase limit threshold.

The first condition is that the remaining amount of the storage cell is not larger than the discharge control threshold.

The second condition is that the difference between the demand power and the generated power is larger than the predetermined power purchase limit threshold.

In other words, when the following conditions are met, the command unit has a limitation unit configured to limit discharged power by the control command so as to discharge only the power corresponding to an excess by which the difference exceeds the power purchase limit threshold.

The first condition is that the remaining amount of the storage cell is not larger than the discharge control threshold.

The second condition is that the difference between the demand power and the generated power is larger than the power purchase limit threshold.

Note that the difference between the demand power and the generated power corresponds to a difference obtained by subtracting the generated power from the demand power.

In addition, the power supply system further includes the history storage unit. The history storage unit stores the demand power and the generated power obtained within the past measurement period, as history information. The threshold setting unit calculates the discharge control threshold by using the history information. The threshold setting unit writes the discharge control threshold into the threshold storage unit.

Moreover, the power supply system of Embodiment 2 further includes the weather information acquisition unit. The weather information acquisition unit is configured to acquire future weather forecast information. The power generator generates power by using natural energy. Therefore, the power generated by the power generator varies depending on the weather. The history storage unit stores the history information for each weather type. The threshold setting unit uses the history information for each weather type to calculate the discharge control threshold. The threshold setting unit writes the discharge control threshold into the threshold storage unit for each weather type. The command unit selects the discharge control threshold corresponding to the weather forecast information from among the discharge control thresholds stored in the threshold storage unit, and uses the selected discharge control threshold.

Embodiments 1 and 2 each disclose the discharge management device. The discharge management device is used in the power supply system. The power supply system includes the power generator, the storage cell and the controller. The power generator generates power. The storage cell stores the power. The controller controls discharge of the storage cell according to a control command. The discharge management device includes the demand measurement unit, the power generation measurement unit, the threshold storage unit, the command unit, and the threshold setting unit. The demand measurement unit measures the demand power of the load. The power generation measurement unit measures the power generated by the power generator. The threshold storage unit stores the discharge control threshold to determine whether to discharge the storage cell. The command unit gives a control command to control the discharge of the storage cell based on the result of comparison between the remaining amount of the storage cell and the discharge control threshold, when the demand power is larger than the generated power. Thus, the controller controls the discharge of the storage cell in response to the control command from the command unit. The threshold setting unit variably sets the discharge control threshold, and writes the set threshold into the threshold storage unit.

In this case, when the demand power is larger than the generated power, the discharge of the storage cell is controlled based on the result of the comparison between the remaining amount of the storage cell and the variably set discharge control threshold. Therefore, stable power supply to the load can be achieved.

The command unit in the discharge management device gives the control command to discharge the storage cell when the remaining amount of the storage cell is larger than the discharge control threshold.

The command unit in the discharge management device gives the control command to suspend the discharge of the storage cell when the remaining amount of the storage cell is not larger than the discharge control threshold and the difference between the demand power and the generated power is not larger than a predetermined power purchase limit threshold.

The command unit in the discharge management device gives the control command to discharge the storage cell when the remaining amount of the storage cell is not larger than the discharge control threshold and the difference between the demand power and the generated power is larger than the predetermined power purchase limit threshold.

The command unit in the discharge management device limits discharged power by the control command so as to discharge only the power corresponding to an excess by which a difference between the demand power and the generated power exceeds the power purchase limit threshold, when the remaining amount of the storage cell is not larger than the discharge control threshold and the difference is larger than the predetermined power purchase limit threshold.

The discharge management device further includes the history storage unit configured to store the demand power and the generated power obtained within the past measurement period, as history information. The threshold setting unit calculates the discharge control threshold by using the history information, and writes the discharge control threshold into the threshold storage unit.

Moreover, as described in Embodiment 2, the discharge management device further includes the weather information acquisition unit configured to acquire future weather forecast information. The power generator generates power by using natural energy. Therefore, the power generated by the power generator varies depending on the weather. The history storage unit stores the history information for each weather type. The threshold setting unit uses the history information for each weather type to calculate the discharge control threshold. The threshold setting unit writes the discharge control threshold into the threshold storage unit for each weather type. The command unit selects the discharge control threshold corresponding to the weather forecast information from among the discharge control thresholds stored in the threshold storage unit, and uses the selected discharge control threshold.

A skilled reader readily will appreciate additional embodiments upon reading this specification and further combinations of the disclosure are contemplated, as space considerations limit further explanation. All embodiments are intended within the scope of the attached claims.

The invention claimed is:

1. A power supply system for supplying power to a load from a commercial power source, a power generator and a storage cell, the system comprising:
    a demand measurement unit configured to measure demand power of the load;
    a power generation measurement unit configured to measure generated power from the power generator;
    a threshold storage unit configured to store a discharge control threshold power value to determine whether to discharge the storage cell;
    a command unit configured to give a control command to control discharge of the storage cell based on a comparison between the remaining power in the storage cell and the discharge control threshold power value, when the demand power is larger than the generated power; and
    a control unit configured to control the discharge of the storage cell according to the control command from the command unit,
    wherein the command unit gives a control command to discharge the storage cell when the remaining storage cell power does not exceed the discharge control threshold power value and a difference between the demand power and the generated power exceeds a predetermined power purchase limit threshold.

2. The power supply system according to claim 1, wherein the command unit gives a control command to discharge the storage cell when the remaining storage cell power exceeds the discharge control threshold power value.

3. The power supply system according to claim 2, wherein the command unit gives a control command to discharge the storage cell when the remaining storage cell power does not exceed the discharge control threshold power value and a difference between the demand power and the generated power exceeds a predetermined power purchase limit threshold.

4. The power supply system according to claim 2, further comprising:
    a history storage unit configured to store a demand power and a generated power obtained within a measurement period, as history information; and
    a threshold setting unit configured to set the discharge control threshold power value, and output the set discharge control threshold power value to the threshold storage unit, wherein
    the threshold setting unit calculates a discharge control threshold power value from the history information, and outputs the calculated discharge control threshold power value to the threshold storage unit.

5. The power supply system according to claim 4, further comprising:
    a weather information acquisition unit configured to acquire weather forecast information, wherein
    the power generator generates power from natural energy that varies with weather types,
    the history storage unit stores history information corresponding to weather types,
    the threshold setting unit calculates the discharge control threshold for each weather type from the history information, and writes a discharge control threshold power value for each weather type into the threshold storage unit, and
    the command unit selects a stored discharge control threshold power value corresponding to a weather type, and compares this selected discharge control threshold power value with remaining power in the storage cell.

6. The power supply system according to claim 1, wherein when the remaining storage cell power does not exceed the discharge control threshold and a difference between the demand power and the generated power exceeds the predetermined power purchase limit threshold, the command unit limits discharged power by the control command to the excess by which the difference exceeds the power purchase limit threshold.

7. The power supply system according to claim 1, further comprising:
    a history storage unit configured to store a demand power and a generated power obtained within a measurement period, as history information; and a threshold setting unit configured to set the discharge control threshold power value, and output the set discharge control threshold power value to the threshold storage unit, wherein the threshold setting unit calculates a discharge control threshold power value from the history information, and outputs the calculated discharge control threshold power value to the threshold storage unit.

8. The power supply system according to claim 7, further comprising:

a weather information acquisition unit configured to acquire weather forecast information, wherein the power generator generates power from natural energy that varies with weather types, the history storage unit stores history information corresponding to weather types, the threshold setting unit calculates the discharge control threshold for each weather type from the history information, and writes a discharge control threshold power value for each weather type into the threshold storage unit, and the command unit selects a stored discharge control threshold power value corresponding to a weather type, and compares this selected discharge control threshold power value with remaining power in the storage cell.

9. The power supply system according to claim 1, wherein the power purchase limit threshold is a threshold used to limit purchased power.

10. A discharge management device configured to control a power supply system that comprises a power generator, a storage cell and a controller that controls discharge of the storage cell according to a control command, wherein the discharge management device comprises a demand measurement unit, a power generation measurement unit, a threshold storage unit, a command unit and a threshold setting unit, the demand measurement unit measures demand power of a load, the power generation measurement unit measures power from the power generator, the threshold storage unit stores a discharge control threshold power value that is used to decide whether to discharge the storage cell, the command unit generates a control command to control storage cell discharge based on a comparison of remaining storage cell power with the discharge control threshold, when the demand power exceeds the generated power, the controller controls storage cell discharge according to the generated control command, and the threshold setting unit sets the discharge control threshold, and outputs the set discharge control threshold to the threshold storage unit.

11. A power supply system comprising the discharge management device according to claim 10.

12. The discharge management device according to claim 10, further comprising:

a history storage unit configured to store a demand power and a generated power obtained within a measurement period, as history information; and a threshold setting unit configured to set the discharge control threshold power value, and output the set discharge control threshold power value to the threshold storage unit, wherein the threshold setting unit calculates a discharge control threshold power value from the history information, and outputs the calculated discharge control threshold power value to the threshold storage unit.

13. The discharge management device according to claim 12, further comprising:

a weather information acquisition unit configured to acquire weather forecast information, wherein the power generator generates power from natural energy that varies with weather types, the history storage unit stores history information corresponding to weather types, the threshold setting unit calculates the discharge control threshold for each weather type from the history information, and writes a discharge control threshold power value for each weather type into the threshold storage unit, and the command unit selects a stored discharge control threshold power value corresponding to a weather type, and compares this selected discharge control threshold power value with remaining power in the storage cell.

14. A power supply system for supplying power to a load from a commercial power source, a power generator and a storage cell, the system comprising:

a demand measurement unit configured to measure demand power of the load;

a power generation measurement unit configured to measure generated power from the power generator;

a threshold storage unit configured to store a discharge control threshold power value to determine whether to discharge the storage cell;

a command unit configured to give a control command to control discharge of the storage cell based on a comparison between the remaining power in the storage cell and the discharge control threshold power value, when the demand power is larger than the generated power; and a control unit configured to control the discharge of the storage cell according to the control command from the command unit, wherein the command unit gives a control command to suspend storage cell discharge when the remaining storage cell power does not exceed the discharge control threshold power value and wherein the difference between the demand power and the generated power does not exceed a predetermined power purchase limit threshold.

15. The power supply system according to claim 14, wherein the command unit gives a control command to discharge the storage cell when the remaining storage cell power does not exceed the discharge control threshold power value and a difference between the demand power and the generated power exceeds a predetermined power purchase limit threshold.

16. The power supply system according to claim 15, wherein when the remaining storage cell power does not exceed the discharge control threshold and a difference between the demand power and the generated power exceeds the predetermined power purchase limit threshold, the command unit limits discharged power by the control command to the excess by which the difference exceeds the power purchase limit threshold.

17. The power supply system according to claim 14, further comprising:

a history storage unit configured to store a demand power and a generated power obtained within a measurement period, as history information; and a threshold setting unit configured to set the discharge control threshold power value, and output the set discharge control threshold power value to the threshold storage unit, wherein the threshold setting unit calculates a discharge control threshold power value from the history information, and outputs the calculated discharge control threshold power value to the threshold storage unit.

18. The power supply system according to claim 17, further comprising:

a weather information acquisition unit configured to acquire weather forecast information, wherein the power generator generates power from natural energy that varies with weather types, the history storage unit stores history information corresponding to weather types, the threshold setting unit calculates the discharge control threshold for each weather type from the history information, and writes a discharge control threshold power value for each weather type into the threshold storage unit, and the command unit selects a stored discharge control threshold power value corresponding to a weather type, and compares this selected discharge control threshold power value with remaining power in the storage cell.

19. The power supply system according to claim 14, wherein the power purchase limit threshold is a threshold used to limit purchased power.

\* \* \* \* \*